United States Patent Office 3,540,286
Patented Nov. 17, 1970

3,540,286
FLOW PRESSURE MEASUREMENTS
Daniel Fraser Davidson, Eastham, England, assignor to United Kingdom Atomic Energy Authority, London, England
Filed Oct. 25, 1968, Ser. No. 770,716
Claims priority, application Great Britain, Nov. 2, 1967, 49,813/67
Int. Cl. G01l 9/00
U.S. Cl. 73—398           6 Claims

ABSTRACT OF THE DISCLOSURE

Apparatus for measuring the pressure in a flowing liquid metal such as sodium comprising: a duct for the passage of the liquid metal; permanent magnet means for setting up a magnetic field transversely of the duct; a pair of spaced electrodes mounted in the duct perpendicular to the length of the duct and perpendicular to the direction of the magnetic field traversing the duct. A connector which may be a section of the wall of the duct is provided linking the electrodes, the connector having an electrical resistance comparable with that between the electrodes in the duct across liquid metal flowing therethrough, and an electric current meter being provided for measuring the current flowing in the conductor.

BACKGROUND OF THE INVENTION

This invention relates to flow pressure measurement. In particular it is concerned with the measurement of flow pressure of liquid metal in a flow path (for example for measuring the delivery pressure of a liquid metal pump).

SUMMARY

According to one aspect of the present invention apparatus for the measurement of pressure in a liquid metal flow path comprises a duct adapted for the passage therethrough of liquid metal and for incorporation in a liquid metal flow path; means disposed about the duct and adapted to set up a magnetic field to traverse the duct; a pair of spaced electrodes mounted in said duct on an axis perpendicular to the longitudinal axis of the duct and perpendicular to the direction of the field traversing the duct, a connector linking said electrodes outside the duct and whose electrical resistence is comparable with that between the electrodes within the duct when liquid metal is flowing therein, and means for measuring current flowing in said connector.

According to another aspect of the present invention a method of measuring pressure in a liquid metal flow path comprises the steps of setting up a magnetic field to traverse the flow path and measuring a function of the current set up in liquid metal in the region of the field (by the passage of said liquid metal through said field) in a direction perpendicular both to the direction of the field and to the direction of the flow, said current function being measured by a circuit whose electrical resistance is similar to that offered across the flow path, in the region of the field, by liquid metal flowing therethrough.

DESCRIPTION OF THE DRAWINGS

An embodiment of the invention, in the form of a liquid sodium flow pressure gauge, will now be described with reference to the accompanying drawings, in which.

DESCRIPTION OF THE PREFERRED EMBODIMENTS

Figure 1:
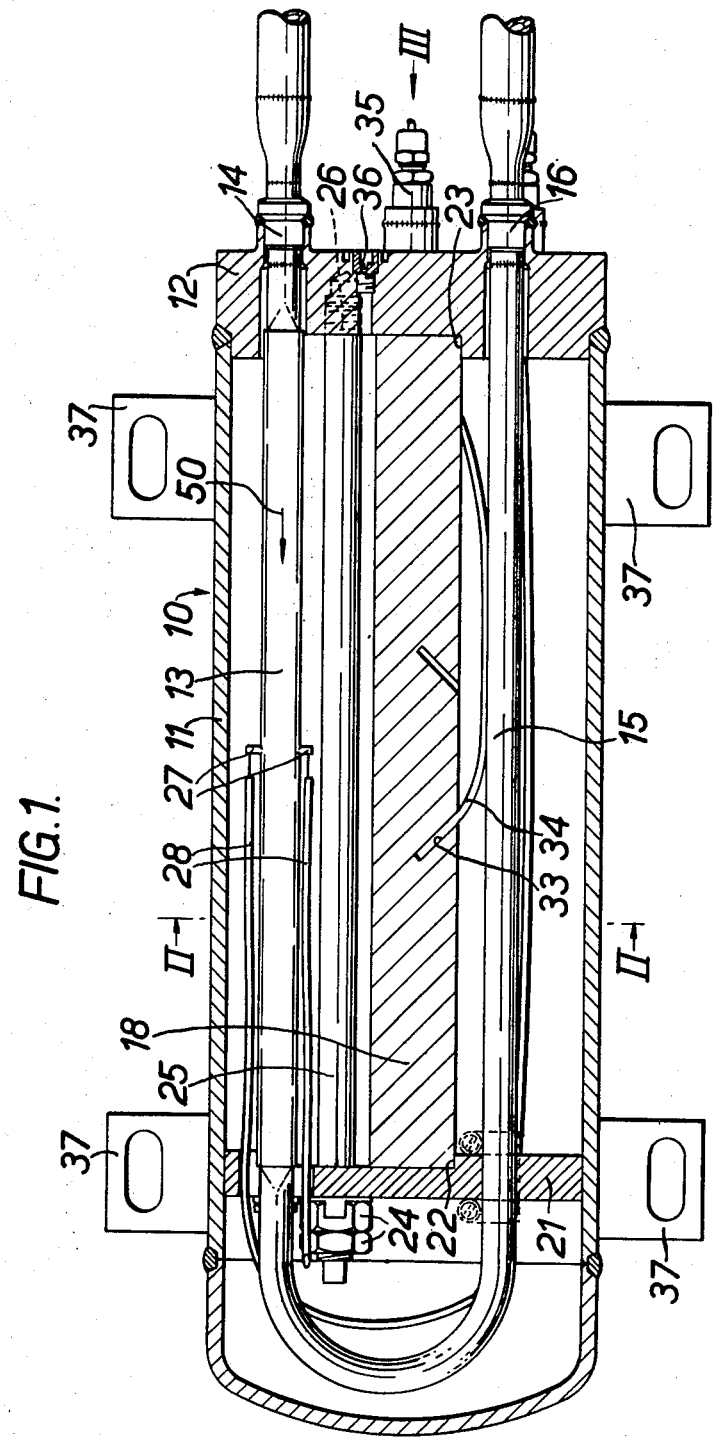
FIG. 1 is a side view in medial section.
Figure 2:
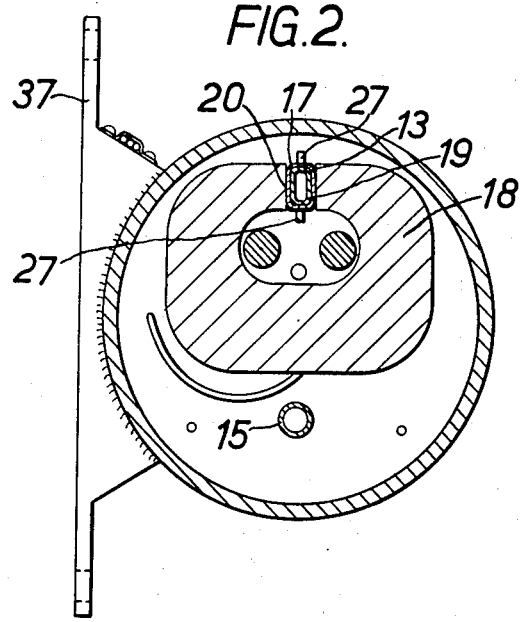
FIG. 2 is an end view in section on line II—II of FIG. 1.

With reference to the drawings the gauge 10 is contained in a stainless steel container 11 closed (FIG. 1) by an end plate 12. The duct of the gauge is embodied by a substantially rectangular cross-section duct 13 (FIGS. 1 and 2) of stainless steel. The duct 13 is incorporated in a liquid metal flow path (not shown) by way of inlet connection 14 and a pressure pipe 15. For measuring purposes flow through the duct is in the direction of arrow 50. The pressure pipe 15 is bent into a U or J shape to allow an outlet connection 16 for the flow path to be mounted in end plate 12. A permanent magnet 18 of C-shape section and high temperature material has its parallel plane pole faces 19, 20 (FIG. 2) extending along the length of the duct 13. One end of magnet 18 is located by a recess 23 (FIG. 1) in the end plate 12. The other end of the magnet 18 is located, by a clamping plate 21, in a shaped recess 22. The clamping plate is held in place together with the magnet 18 by nuts 24 screwed down and locked on a screwed stud 25 whose opposite end is screwed into a threaded blind-ended recess 26 in end plate 12.

The pair of electrodes of the invention are embodied by a pair of stainless steel lugs 27 (FIGS. 1 and 2) welded on opposite sides of duct 13. The lugs 27 lie on a common axis which is perpendicular both to the longitudinal axis of duct 13 and to the magnet field between pole piece faces 19, 20 of magnet 18. The two lugs 27 are joined outside the duct by a connector which could be the duct wall itself except that stainless steel has a rather high resistivity compared with the sodium within the duct between the electrodes 27. Consequently a thin coat of copper 17 (FIG. 2) is provided on the outside of the duct linking the electrodes. The length of the magnetic poles (and the copper coating) is selected to suit the pressure range required—a higher pressure would require a longer magnet and coating. Silver could be used as an alternative coating to copper. The lugs 27 each have a length of mineral insulated cable 28 welded to them which pass to terminals 32, 32 mounted on the end plate 12.

The magnet 18 has a blind ended recess 33 in which is inserted a stainless steel sheathed thermocouple 34 which passes out of the end plate 12 by way of a fluid tight gland 35.

The end plate 12 has a sealing plug 36 (FIGS. 1 and 3) enabling the interior of the container 11, typically, to be evacuated or inspected.

The container 11 is welded to slotted mounting brackets 37.

Figure 3:
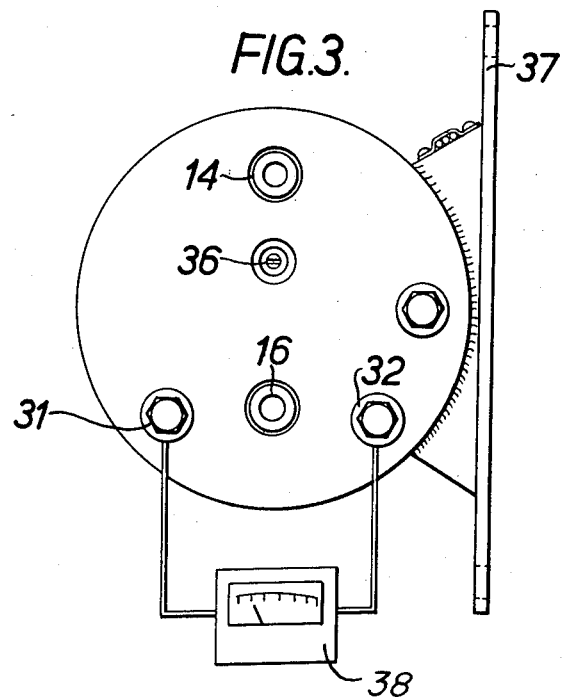
FIG. 3 is an end view of FIG. 1 taken in the direction indicated by arrow III.

The terminals 31, 32 are connected with an electrical current meter 38 as shown in FIG. 3.

For use the gauge 10 is incorporated in a liquid metal flow circuit by way of inlet connection 14 and outlet connection 16. The flow through the duct 13 is in the direction indicated by arrow 50. The flow of liquid metal cuts through the magnetic field set up across duct 13 between pole piece faces 19, 20 of magnet 18. In cutting the lines of force of the magnetic field the liquid metal induces an electrical current to flow by way of lugs 27, and cable 28 through the conventional electric current measuring means 38.

Another view is to say that the induced current, passing through the liquid metal in the presence of the magnetic field, produces a pressure in the same way as it does in an electromagnetic pump. This pressure is in such a direction as to oppose the flow: that is to say in opposition to the applied pressure. Thus a measurement of the induced current can be used as a measure of the opposing pressure. By making the hydralic pressure drop associated with the liquid flow small, the opposing pressure is nearly equal to the applied pressure. The gauge operates in effect as an electromagnetic brake.

From simple pump theory, the opposing pressure (P) induced is derived from:

$$P = \frac{B \cdot I}{d} \times 10^{-4} \text{ g./cm.}^2$$

Where:

B = flux density (gauss)
I = total current (amps.)
d = duct diameter (cms.)

The voltage (E) measured across the connector is derived from:

$$E = I \cdot R$$
$$= \frac{P \cdot d}{B} \times 10^4 \times R$$

Where R = connector resistance, ohms.

If connector resistance is made equal to sodium resistance between electrodes then $$R = \frac{\rho W}{t \cdot 1}$$

Where $\rho$ = resistivity of sodium
1 = effective length of field in duct
W = width of rectangular duct
t = depth of duct $$\therefore E = \frac{P \cdot \rho \cdot W}{B \cdot 1} \times 10^4 \text{ volts.}$$

Thus with a knowledge of the geometry of the system, the magnetic field and a function of the current typically the voltage measured across the electrodes the pressure of sodium in the duct can be determined.

To determine the conditions for small hydraulic pressure loss, we first find sodium velocity, $v$, from e.m.f. generated $= BWv \times 10^{-8}$ volts.
therefore, $$v = \frac{2P\rho}{B^2 1} \times 10^{12} \; {}^{2=E}_{\text{cms/sec}}$$

By way of example:

When:

P = 100 p.s.i. (= 7000 gms./cm.²);
B = 5,000 gauss;
1 = 30 cms.;
$\rho = 20 \times 10^{-6}$ ohm. cms. (Na at 400° C.).

Then:

$v = 373$ cms./sec.
Taking W = 1 cms. and $t = 0.6$ cms.
(obtained by flattening a ¼" nominal bore pipe of stainless steel)
Reynolds number, Re = $vsD$
Density, $s = .854$ gms./cm.³
Viscosity, $\eta = 2.78 \times 10^{-3}$ poise
D = 4 × area = .75 cms.
  perimeter
$\therefore Re = 8.6 \times 10^4$ For smooth bore pipe, hydraulic pressure drop, $P_H$ is gained from:

$$P_H = \frac{.316}{R_e^{1/4}} \cdot \frac{sv^2}{2g} \cdot \frac{1}{D}$$

$$= 44.4 \text{ gms./cm.}^{-2} = 0.635 \text{ p.s.i.}$$

$$\therefore P_{H/p} > 1\%$$

I claim:

1. Apparatus for the measurement of pressure in a liquid metal flow path comprising: a duct adapted for the passage therethrough of liquid metal and for incorporation in the flow path; means disposed about the duct and adapted to set up a magnetic field to traverse the duct; a pair of spaced electrodes mounted in said duct on an axis perpendicular to the longitudinal axis of the duct and perpendicular to the direction of the magnetic field traversing the duct; a connector linking said electrodes outside the duct and whose electrical resistance is comparable with that between the electrodes within the duct when liquid metal is flowing therein; and means for measuring a function of the current flowing in said connector.

2. Apparatus for the measurement of pressure according to claim 1, wherein the means disposed about the duct and adapted to set up a magnetic field to traverse the duct comprises a permanent magnet.

3. Apparatus for the measurement of pressure according to claim 1, wherein the connectors linking said electrodes is a section of the wall of the duct.

4. Apparatus for the measurement of pressure according to claim 3, wherein said section is made up of at least two layers of differing electrical resistivity.

5. Apparatus for the measurement of pressure according to claim 1, wherein said function is the current magnitude.

6. Apparatus for the measurement of pressure according to claim 1, wherein said function is the magnitude of the e.m.f. generating said current.

References Cited
UNITED STATES PATENTS

| | | | |
|---|---|---|---|
| 2,149,847 | 3/1939 | Kolin | 73—194 |
| 3,364,749 | 1/1968 | Sipin | 73—398 |

DONALD O. WOODIEL, Primary Examiner